United States Patent [19]
Liberman

[11] 3,819,071
[45] June 25, 1974

[54] REFUSE COLLECTION VEHICLE PACKING HEAD

[75] Inventor: Harvey W. Liberman, Knoxville, Tenn.

[73] Assignee: Carrier Corporation, Syracuse, N.Y.

[22] Filed: Mar. 2, 1973

[21] Appl. No.: 337,619

[52] U.S. Cl. ............................................. 214/83.3
[51] Int. Cl. ............................................... B65f 3/00
[58] Field of Search................... 214/83.3, 510, 508

[56] References Cited
UNITED STATES PATENTS

| | | | |
|---|---|---|---|
| 3,220,586 | 11/1965 | Gollnick | 214/83.3 X |
| 3,252,600 | 5/1966 | Beisson et al. | 214/83.3 X |
| 3,402,837 | 9/1968 | Palmer et al. | 214/83.3 |
| 3,696,951 | 10/1972 | Toppins et al. | 214/83.3 |

*Primary Examiner*—Frank E. Werner
*Attorney, Agent, or Firm*—J. Raymond Curtin; Donald F. Daley

[57] ABSTRACT

A refuse compaction system in a refuse collection vehicle having a movable plate inside the vehicle body against which refuse may be compacted; a hydraulic ram to hold and move the plate, and a variable valve having means to regulate the fluid pressure in the ram according to the position of the plate in the vehicle body.

7 Claims, 3 Drawing Figures

PATENTED JUN 25 1974 3,819,071

3,819,071

REFUSE COLLECTION VEHICLE PACKING HEAD

BACKGROUND OF THE INVENTION

This invention relates generally to refuse collection vehicles and specifically to packing mechanisms in the body of refuse collection vehicles.

In refuse collection vehicles of the type disclosed in co-pending application Ser. No. 59,453, filed July 30, 1970, now U.S. Pat. No. 3,696,951 refuse is loaded into a hopper mounted on the tailgate of a truck having an enclosed body or storage compartment. Refuse deposited in the tailgate hopper is swept from the hopper into the enclosed body of the truck under the action of a packer plate or other type of mechanism which will sweep the refuse into the body of the truck with force sufficient to compress and compact the material in the body of the truck. Without other means to aid in the compaction process, the refuse would be swept into the truck until the storage compartment of the truck was essentially full before any appreciable compaction within the storage compartment would take place. With this type of arrangement the refuse material in the storage compartment would vary in compaction from loosely compacted at the front of the storage compartment to its maximum compaction at the rear of the storage compartment.

As used herein, the front of the storage compartment refers to the portion closest to the front of the vehicle and the rear of the compartment refers to the portion closest to the rear of the vehicle.

To insure compaction throughout the storage compartment, it is known to provide a movable panel or ejector head extending across the storage compartment and movable from the front to the rear of the storage compartment. Either automatic or manual means to position or move and panel are provided, as for example, a hydraulic cylinder which extends from the front of the storage compartment to the rear of the movable panel. The panel is normally positioned near the rear of the compartment when the compartment is empty and the refuse in the packer unit on the truck tailgate is packed against the movable panel until a predetermined degree of compaction is attained, at which time the panel is incrementally moved toward the front of the storage compartment. The movable panel is also used to eject compacted waste material from the storage compartment when the storage compartment is to be emptied.

The adjustment to the position of the panel in the storage compartment is usually responsive to a predetermined pressure build-up within the fluid system controlling the movable panel. It is known to provide an unloading valve within the fluid system so that as the compaction pressure on the refuse and on the movable panel builds up, the pressure of the fluid operating the cylinder increases until the valve which is set to actuate at a given pressure is actuated and the panel is allowed to move toward the front of the storage compartment an incremental amount. Refuse is again compacted against the panel until the pressure in the system is again sufficient to operate the valve and allow another incremental movement of the panel. A problem in this type of system is that the pressure setting which is required to operate the valve remains constant while the pressure used to compact refuse at the rear of the compartment increases. The density of the refuse at the rear of the compartment is considerably higher than the density at the front of the compartment because of friction loss between the compacted refuse material and the sides of the storage compartment and absorption of energy in the compacted mass. The difference in pressure on the refuse material at the rear and the front of the storage compartment increases as the load in the storage compartment increases so that at nearly full load the side pressure exerted by the compacted refuse creates undesirable strain on the sides of the storage compartment. Alternatively, reducing the setting of the valve to prevent pressure build-up as the load increases, results in insufficient packing pressures when the storage compartment is only partially full and decreases the effective capacity of the compartment.

SUMMARY OF THE INVENTION

It is, therefore, an object of this invention to improve refuse collection vehicles and to increase the effective load of refuse collection vehicles without increasing the forces on the side of the storage compartment in the refuse collection vehicles.

It is a further object of this invention to maintain relatively constant the compaction pressure of refuse material in a collection vehicle during the loading.

It is a further object of this invention to maintain a uniform density of compacted refuse material throughout a collection vehicle storage compartment.

It is a further object of this invention to improve the efficiency of usage of refuse collection vehicles.

It is a further object of this invention to provide storage compartments of refuse collection vehicles with a movable plate against which refuse is compacted within the storage compartment, which is advanced at a rate which maintains a uniform density of compacted material, independent of the position of the plate within the storage compartment.

These and other objects of this invention are attained by means of an ejector plate which traverses the storage compartment of a refuse compaction unit and which is longitudinally movable in the storage compartment. Movement of the ejector plate is controlled by a fluid cylinder which holds the plate against the compaction forces produced on the refuse and which allows movement of the plate in response to pressure on the plate and back pressure in the fluid system by means of a variable relief valve. The pressure setting of the relief valve is controlled by the position of the plate within the storage compartment.

DESCRIPTION OF THE PREFERRED EMBODIMENT

Figure 1:
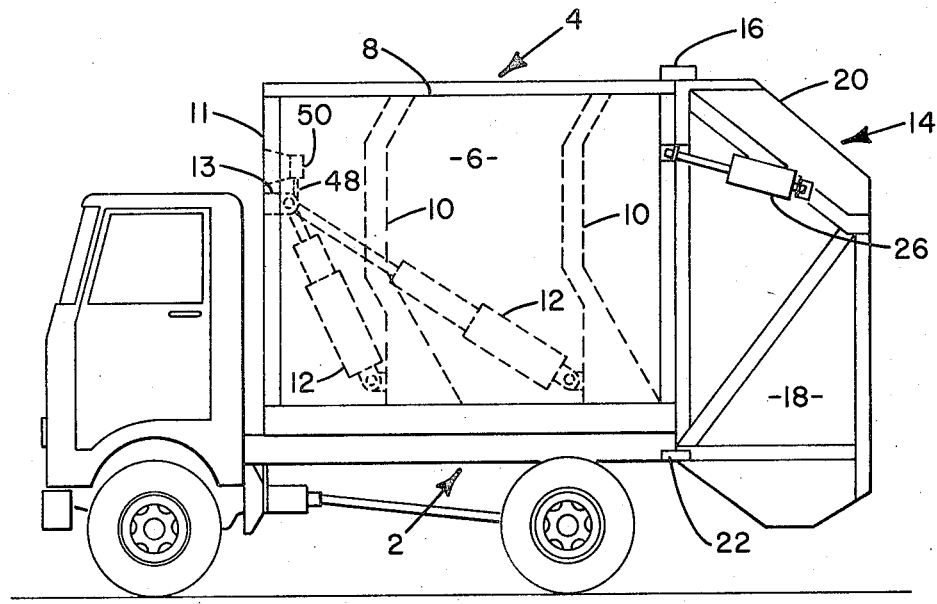
FIG. 1 is the side elevational view of a refuse collection vehicle showing the ejector plate at the rear of the compartment and in a partially retracted position.

Referring to FIG. 1 there is shown a refuse collecting vehicle of the type suitable for use with the present invention. The vehicle includes a chassis 2 on which a refuse body 4 is secured. The body 4 has opposite side walls 6 and a top wall 8, which are suitable braced to resist deflection due to the pressure exerted by the contents of the body 4.

A combination ejector plate and packer head 10, referred to herein as "ejector plate" is mounted in the interior of the body 4 for reciprocating movement between a front and rear position. The ejector plate 10 is shown in the rear position, i.e., toward the rear of the truck, and in a partially forward position toward the front of the truck, in FIG. 1. The ejector plate is capable of moving toward the front wall 11 of the refuse body 4 until it is within approximately 6 inches of the front wall. The space between the rear of the ejector plate 10 and the front wall 11 is sized to accommodate cylinders and mounting brackets required for movement of the ejector plate 10. The plate extends across the full width of the body between the side wall 6 and between the top 8 and the bottom of the body 4. The ejector plate 10 is slidably mounted in the body 4 by means of guides or rails on the bottom surface of the body 4 and also, on the top of the body 4. The guides or brackets may be of any standard design (not shown herein). Thus, the plate forms a movable front wall for the body 4. A telescoping hydraulic ram 12 extends between a bracket 13 on the body front wall 11 and a bracket near the bottom of the ejector plate 10. Extension of the ram 12 displaces the ejector plate 10 toward the rear of the body 4, while retraction of the ram 12 displaces the ejector plate toward the front of the body.

A tailgate assembly 14 is mounted on hinges 16 at the rear of the body 4. The tailgate assembly 14 has side walls 18 and a top 20. The side walls 18 are spaced apart approximately the same distance as the side wall 6 of the body 4, so that the tailgate assembly 14 forms a closure for the rear end of the body 4. Latches 22 adjacent the bottom of the body 4 are provided on opposite sides of the tailgate 14. These latches are preferably the type having screw threads for drawing the tailgate assembly 14 firmly against the rear edge of the side walls 6 and the bottom of the body 4. A sealing strip extends along the front edge of the side walls 18 and across the bottom edge of the tailgate assembly to prevent leakage between the edges of the tailgate assembly 14 in the body 4. By tightening the latches 22 a sealing strip is compressed to provide an effective seal.

A pair of hydraulic rams 26 are provided on opposite sides of the tailgate assembly 14. The rams 26 are attached at one end to a brace on the side wall 18 and at the opposite end to a bracket on the side wall 6 of the body. By releasing the latches 22 and extending the rams 26 the tailgate assembly 14 can be made to swing vertically about the hitches 16 for dumping the contents of the body 4 by moving the ejector plate 10 rearwardly.

Refuse material is loaded into the refuse body 4 by means of a packer assembly mounted in the tailgate assembly 14. Refuse is dumped by an operator into an opening in the rear of the vehicle in tailgate assembly 14 and the packer mechanism compresses the refuse and sweeps it up into the body 4. Details of the packer mechanism suitable for use with a vehicle of the type disclosed is shown in U.S. Pat. No. 3,696,951, issued Oct. 10, 1972. If the ejector plate 10 were not located in the body 4 of the refuse vehicle, then trash and refuse would be swept by the packer assembly into the body until the body was essentially full, at which time the packer assembly would begin to compress the material in the body and effectively increase the capacity of the body. Under this type of operation, the refuse would be loosely loaded in the body 4 at the front end of the body and the compaction pressure at the rear end of the body. Due to the absorption of compaction pressures in the material itself, and due to the friction between the material and the side walls of the body, the pressure applied to the refuse material would decrease from the rear end of the body toward the front end of the body, thus producing a non-uniformly packed load. By mounting the ejector plate 10 in the body 4 and moving the plate toward the rear of the body as shown in FIG. 1, the refuse material which is forced into the body 4 by the packer assembly and tailgate 14 almost immediately starts to compact and compress the material against the ejector plate. By incrementally moving the ejector plate 10 toward the front of the body as the desired compaction pressures are reached, a substantially uniformly packed load can be attained.

The incremental forward movement of the ejector plate 10 may be accomplished through use of the hydraulic cylinder ram 12. The ram 12 serves two functions to eject the load by moving the plate from the forward portion of the body to the rearward portion, as described above, or it may also be used to hold the plate 10 against the compaction forces created when refuse is being loaded. In addition, it serves as a means to allow the incremental rearward movement of the plate 10 during loading of the body 4. Ram 12, as shown herein, is composed of a three-stage hydraulic cylinder which is pivotally mounted to the front wall 11 of the body and to the lower rear portion of the ejector plate 10. The three cylinder stages of the cylinder are of different size so that as the cylinder closes or moves to the non-extended position, effective surface area of the cylinder under the influence of the hydraulic force increases. That is, a larger cylinder of the telescopic cylinders is acting against the ram in the forward position of the ejector plate 10. Also, as seen in FIG. 1, the vertical orientation of the cylinder changes through the movement of the ejector plate 10 from the rear to the front of the body. When the plate 10 is in the front or loaded position, the cylinder is acting at a sharper angle to the plate than when the plate is in the rearward position. The horizontal component of the force acting against the plate to compact refuse is less in the forward position than in the rearward position. The change in the horizontal component of force is opposite from the change of the force due to the different cylinder size and tends to compensate for the increase in force due to cylinder size as the plate moves toward the front of the body.

Figure 2:
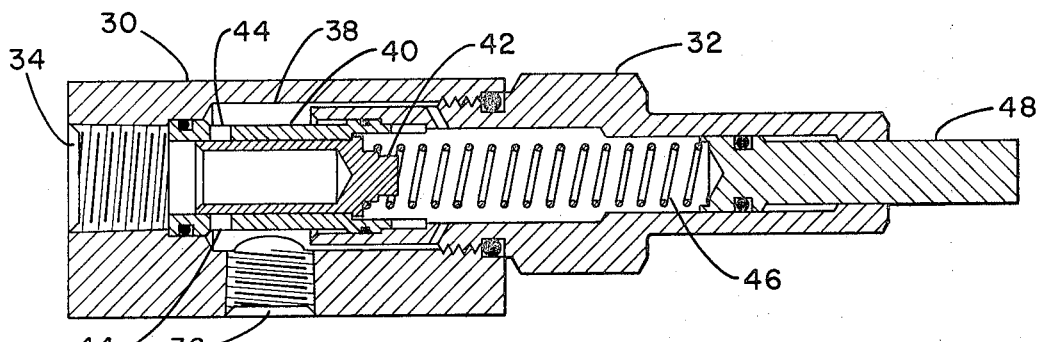
FIG. 2 is a sectional view of a relief valve suitable for use on the present invention.

Referring to FIG. 2, there is shown a relief valve of the type suitable for use in the present invention. The main body of the valve is indicated at 30 and a spring and stem housing connected to the main body is indicated at 32. The main body has an inlet port 34 and an outlet port 36. The inlet port 34 is adapted to receive fluid from a pressure source and pass that fluid to an interior chamber 38 of the main body. The outlet port 36 communicates with the chamber 38 and a fluid reservoir. Bushing 40 is mounted in the chamber 38 and has an internal bearing surface to accommodate the flow controller 42. The flow controller 42 is movable in the bushing 38 to cover or uncover a pair of orifices 44 which provide communication between the inlet port 34 and the outlet port 36 through the chamber 38.

The spring and stem housing 32 is secured to the main body 30 and has an internal bore which is open to the chamber 38 of the main body. Compression spring 46 is mounted in the bore of the housing 32 with one end acting against the flow controller 42 to urge the flow controller to the closed position. The other end of the spring 46 is held by a stem 48. Stem 48 is movable within the bore of the housing 32 so that the effective length of the compression spring 46 can be varied by movement of the stem 48. As the stem 48 is moved inward into the housing 32, the compression spring is shortened and the effective pressure of the spring against flow controller 42 is increased, thus requiring a greater pressure to move the flow controller to the unloading position whereby fluid entering inlet port 34 passes through the orifice 44 to the outlet port 36. Movement of the stem 48 in an outward direction effectively decreases the spring pressure against the flow controller 42, thus allowing the relief valve to operate at a lower pressure at the inlet port 34.

In FIG. 1 the relief valve is indicated generally at 50 and is shown as being attached to the forward wall 11 of the body 4 in a position so that the stem 48 is actuated by movement of the ram 12. As the ejector plate 10 moves toward the rear of the body 4 the stem 48 is forced inward, increasing the pressure required to operate the relief valve 50. As the ejector plate 10 moves toward the front of the body 4, the ram 12 moves toward a more nearly vertical position and the stem 48 is allowed to move out on the housing 32, thus reducing the pressure required to operate the relief valve 50. The valve 50 may be located in any position wherein the valve stem is actuated in response to movement of the ejector plate or ram or is responsive to the position of the ejector plate.

Figure 3:
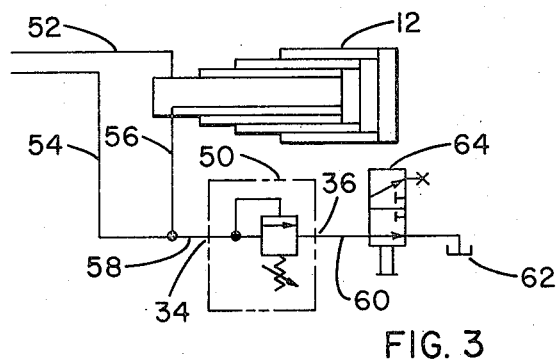
FIG. 3 is a schematic view of a portion of a hydraulic circuit for use in the present invention.

FIG. 3 shows a schematic arrangement of a portion of a hydraulic circuit, incorporating the valve 50 and the telescopic hydraulic ram cylinder 12. Hydraulic fluid under pressure is supplied from a reservoir and pump (not shown), to a line 52. Discharge fluid in line 52 will cause the ram cylinder 12 to retract drawing the ejector plate 10 toward the front of the truck body 4. Second line 54 is also connected to a high pressure fluid source and communicated with a line 56 to the head end of the cylinder 12. The line 54 is coupled to the high pressure fluid, the cylinder 12 extends toward the rear of the body 4, forcing the ejector plate 10 on the forward position to the rearward position, either ejecting a load of refuse in the body 4 or providing resistance against packing pressures created by the refuse and the packing mechanism in the tailgate assembly 14. The relief valve 50 is connected to the high pressure fluid in the lines 54 and 56 through the line 58 and inlet port 34. Outlet port 36 is connected to a line 60 leading to a fluid reservoir 62. In the line 60 there is a spool valve 64 which is positionable to either allow fluid to pass through the reservoir 62 or to dead-end the fluid from the relief valve 50.

When refuse is to be ejected from the body 4 with the ejector plate 10 in the forward position and the ram 12 collapsed the spool valve 64 is moved to the blocked or dead-ended position so that pressures in excess of the unloading pressure of the valve 50 may be attained. It may be necessary to exceed the pressures of the valve in order to force the entire load of refuse out of the body 4 by ejector plate 10. When refuse is being packed into the body 4 the spool valve 64 is moved to the position wherein fluid passing through the relief valve 50 is directed to the reservoir 62 for reuse within the system.

In operation, the combination packing head and ejector plate 10 first serves to provide a movable wall against which refuse may be packed into the body against a predetermined back pressure. As the pressure of refuse packed against the ejector plate 10 increases, the pressure setting of the relief valve 50 is exceeded and hydraulic fluid is released through the valve to the reservoir 62. The resulting drop in pressure in the cylinder 12 allows the ejector plate 10 to move toward the front of the body 4 under the pressure of the refuse until the pressure in the cylinder again builds up to a point sufficient to produce movement of the ejector plate. These steps are continually repeated until the plate 10 is back to its foremost position in the body 4.

With the plate 10 moved an incremental amount toward the forward portion of the body 4, additional pressure would be required against the refuse at the rear of the body 4 in order to reach a predetermined magnitude of pressure on the plate 10. This is due in part to the frictional forces of the refuse against the sides of the body 4 and due to the energy absorbed within the refuse material itself. In order to maintain the packing density at the rear of the body 4 relatively constant, the setting of the relief valve 50 is reduced by the movement of the stem 48 acting against the spring 46 of the relief valve 50. With the setting of the valve 50 being changed for each incremental step of the plate 10, the density of the refuse in the body remains relatively constant throughout the entire load.

When the body 4 is full of compacted refuse, the vehicle is normally taken to an unloading area and the tailgate assembly 14 is swung upward about hinges 16 by means of the hydraulic ram 26. The operator then changes the spool valve 64 so that the fluid from the relief valve 50 is dead-ended. Fluid is then provided under pressure through lines 54 and 56 to cause the ram 12 to force the ejector plate 10 to move toward the rear of the truck forcibly pushing the refuse out of the truck. Because the refuse has been compacted in the vehicle body 4 and there are frictional forces acting on all sides of the compacted mass of refuse and the body walls, it may be necessary to exceed the actual pressure setting of the valve 50. This can be accomplished in this mode of operation because the spool valve 64 has previously been moved to the blocking position.

It should be understood that the location and operating characteristics of the valve 50 may be varied within the scope of this invention. Other types of valves or fluid regulating means may be used to incrementally decrease the pressure exerted by the ram 12. While the invention has been illustrated and described in certain embodiments, it is recognized that other variations and changes may be made therein without departing from the invention as set forth in the following claims.

What is claimed is:

1. In a refuse compaction system of the type wherein refuse or the like is compressed and compacted into a refuse collection chamber against a plate which extends across the chamber and is movable through the chamber, wherein the improvement comprises a compaction pressure control system including:

a hydraulically operated ram connected to the plate to move the plate through the chamber and to hold the plate in stationary positions in the chamber;

means to supply pressurized fluid to the ram;

a pressure relief valve in the fluid supply means to release pressurized fluid when an initial release pressure is reached; and means responsive to the position of the plate within the chamber to vary the release pressure in the relief valve.

2. A compaction pressure control system in accordance with claim 1 further including:

a spool valve having a first position to direct pressurized fluid from the relief valve to a reservoir and a second position to restrict flow of pressurized fluid from the relief valve to allow the fluid pressure to exceed the predetermined pressure.

3. A compaction pressure control system in accordance with claim 1 wherein the means to vary the release pressure in the relief valve includes:

a spring loaded plunger positioned in the chamber to detect the angular position of the ram and to vary the release pressure whereby the release pressure in the relief valve is varied in accordance with the angular position of the ram.

4. In a refuse collecting vehicle of the type wherein refuse material is forced into a storage compartment under sufficient pressure to produce compaction of the material within the compartment against an ejector plate traversing the compartment and movable longitudinally of the compartment to provide a wall against which the refuse material may be compacted, and the position of the ejector plate within the storage compartment is controlled by a fluid operated cylinder mounted behind the ejector plate, the improvement comprising:

a variable pressure relief valve in the fluid system to the cylinder;

said relief valve being positioned in the fluid system to be responsive to the fluid pressure in the system; and means to vary the pressure setting of the relief valve in response to the position of the packer head within the storage compartment.

5. The improvement of claim 4 wherein the pressure setting of the relief valve is controlled by the angular position of the fluid cylinder.

6. The improvement of claim 5 wherein the pressure setting of the relief valve is continuously decreased throughout the movement of the packing head through the storage compartment.

7. In a refuse collecting vehicle of the type wherein refuse or the like is packed into the body of the vehicle under sufficient pressure to produce compaction of the material within the body and wherein an ejector plate internally traversing the body is movable through the length of the body to provide a barrier against which the refuse material may be compacted as it is forced into the body, a compaction control system including:

a hydraulically operated ram connected at one end to front wall of the body and at the other end to the back of the ejector plate;

means to supply high pressure hydraulic fluid to the ram to move the ejector plate through the length of the body and to hold the plate stationary within the body against the action of the compacting forces on the refuse material;

relief means in the pressurized fluid supply means to release the hydraulic fluid acting on the ram upon the detection of an initial release in the pressurized fluid supply means;

means in the pressurized fluid supply means to vary the release pressure upon which the pressure relief means will actuate;

said means being positioned to detect the angular position of the ram and to vary the release pressure at which the relief means will actuate in accordance with the position of the ejector plate in the body; and means to override the release pressure in the relief valve whereby pressure in the relief valve may be exceeded.

* * * * *